US006879864B1

(12) United States Patent
Cleary, Jr.

(10) Patent No.: US 6,879,864 B1
(45) Date of Patent: Apr. 12, 2005

(54) DUAL-BAR AUDIO LEVEL METER FOR DIGITAL AUDIO WITH DYNAMIC RANGE CONTROL

(75) Inventor: Edward J. Cleary, Jr., Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/518,432

(22) Filed: Mar. 3, 2000

(51) Int. Cl.[7] .......................... G06F 17/00; H04R 29/00; G09G 3/04; G09G 5/22

(52) U.S. Cl. ........................... 700/94; 381/58; 381/124; 345/40; 345/440.2

(58) Field of Search ............................ 700/94; 381/124, 381/12, 56, 58; 345/40, 440.02; 324/103 R

(56) References Cited

U.S. PATENT DOCUMENTS 3,922,666 A 11/1975 Inami et al.
5,524,060 A * 6/1996 Silfvast et al. .............. 381/104
5,751,819 A * 5/1998 Dorrough .................... 381/56
RE36,840 E * 8/2000 Mihalisin et al. ........ 345/440.2

OTHER PUBLICATIONS

Todd et al., "AC–3: Flexible Perceptual Coding for Audio Transmission and Storage", Online, Feb. 26, 1996, Audio Engineering Society, New York, NY, USA, XP002221197, Retrieved from the internet:<URL: http://www.dolby.com/tech/ac3flex.html> retrieved on Nov. 18, 2002.

* cited by examiner

*Primary Examiner*—Minsun Oh Harvey
*Assistant Examiner*—Andrew Graham
(74) *Attorney, Agent, or Firm*—Francis I. Gray

(57) ABSTRACT

A dual bar audio level meter for a digital audio signal with dynamic range control decodes the digital audio signal to produce a full range audio signal and control parameters. A reduced range audio signal is derived from the full range audio signal using the control parameters, and the reduced and full range audio signals are processed to present a display having a pair of bars for each channel of the digital audio signal. The dual bars may be in the form of an inner bar representing the full range audio signal and an outer bar encompassing the inner bar representing the reduced range audio signal. A dual peak indicator also may be used to provide peak information for each channel.

2 Claims, 1 Drawing Sheet

10

DUAL-BAR AUDIO LEVEL METER FOR DIGITAL AUDIO WITH DYNAMIC RANGE CONTROL

BACKGROUND OF THE INVENTION

The present invention relates to the monitoring of audio signals, and more particularly to a dual-bar audio level meter for digital audio with dynamic range control.

Broadcast audio almost always is processed before transmission to reduce its dynamic range. There are several reasons for this practice: (1) the transmission system signal-to-noise ratio (SNR) is not great enough to handle a wide dynamic range; (2) typical listeners want limited range for most listening environments; and (3) the station may push up the average level so the station sounds louder and grabs the attention of a listener tuning across the band. This processing often is overdone, and becomes offensive to listeners who want to hear the full dynamic range.

With the advent of digital broadcasting, digital television particularly, there now is a way to accommodate both the casual listener who wants to keep the volume more or less constant and the critical listener who wants to experience the full dynamic range of a concert hall or theater. The uncompressed full range audio is transmitted along with a varying control signal that the receiver may use to automatically control the audio level. The listener may choose which way to listen depending upon the environment. The Dolby AC-3 standard for digital television in the United States of America includes a sophisticated implementation of this dynamic range control technique. In order to monitor the digital audio signal an operator uses a conventional audio level meter and monitors the signal first with the dynamic range control on and then with the dynamic range control off. This requires the operator to constantly switch between the two modes in order to monitor the digital audio signal.

What is desired is a means for monitoring digital audio signals with dynamic range control using a display that is simple to read and understand, and that presents the digital audio signals both with and without dynamic range control simultaneously.

BRIEF SUMMARY OF THE INVENTION

Accordingly the present invention provides a dual-bar audio level meter for digital audio with dynamic range control. The digital audio signal with imbedded dynamic control parameters is decoded by an audio decoder to extract the full range digital audio signal and the control parameters. The full range digital audio signal and control parameters are input to an audio range reduction processor to provide a reduced range audio signal. Both the full and reduced range audio signals are then processed by a display processor to generate a double bar graph display for each audio channel of the input digital audio signal. The bar display has an inner bar to represent one of the reduced or full range audio channel and an outer bar to represent the other of the reduced or full range audio channel. A corresponding peak level display also is provided.

The objects, advantages and other novel features of the present invention are apparent from the following detailed description when read in conjunction with the appended claims and attached drawing.

DETAILED DESCRIPTION OF THE INVENTION

In designing a monitor for digital audio signals with dynamic range control, it is desirable to show the audio level both with and without the dynamic range control parameter ("dynrng") applied. This allows an operator to see both the true digital audio level as transmitted as well as the level that will be heard by a listener with dynamic range control applied.

Figure 1:
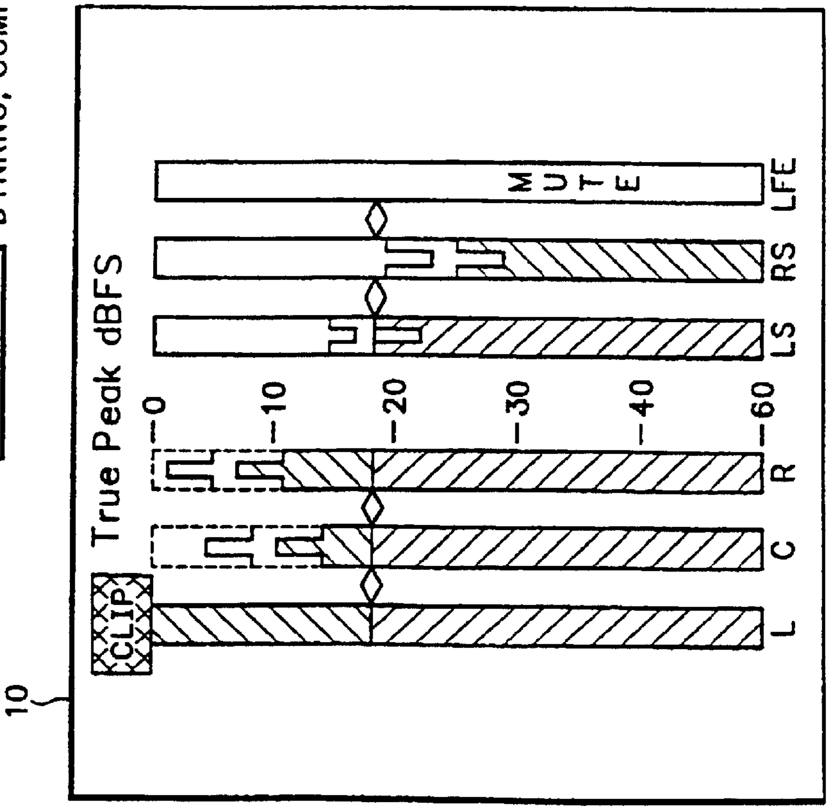
FIG. 1 is a plan view of a dual-bar audio level meter display for digital audio with dynamic range control according to the present invention.

Referring now to the FIG. 1 a bar-graph style level meter display 10 is shown for 5.1-channel surround sound, where there is a center channel C, a front stereo channel L, R and a rear stereo channel LS, RS for a total of five sound sources or channels of digital audio. For each channel a bar graph is displayed, with each bar having an inner and an outer bar. The inner bar shows the true level of the digital audio as transmitted for the channel, and the outer bar shows the level as modified by the dynamic range control parameter dynrng. Also included is a peak hold symbol above the moving bar to indicate and hold peak readings. For the dual bars the symbol is modified to indicate the peaks of both the inner and output bars.

Figure 2:
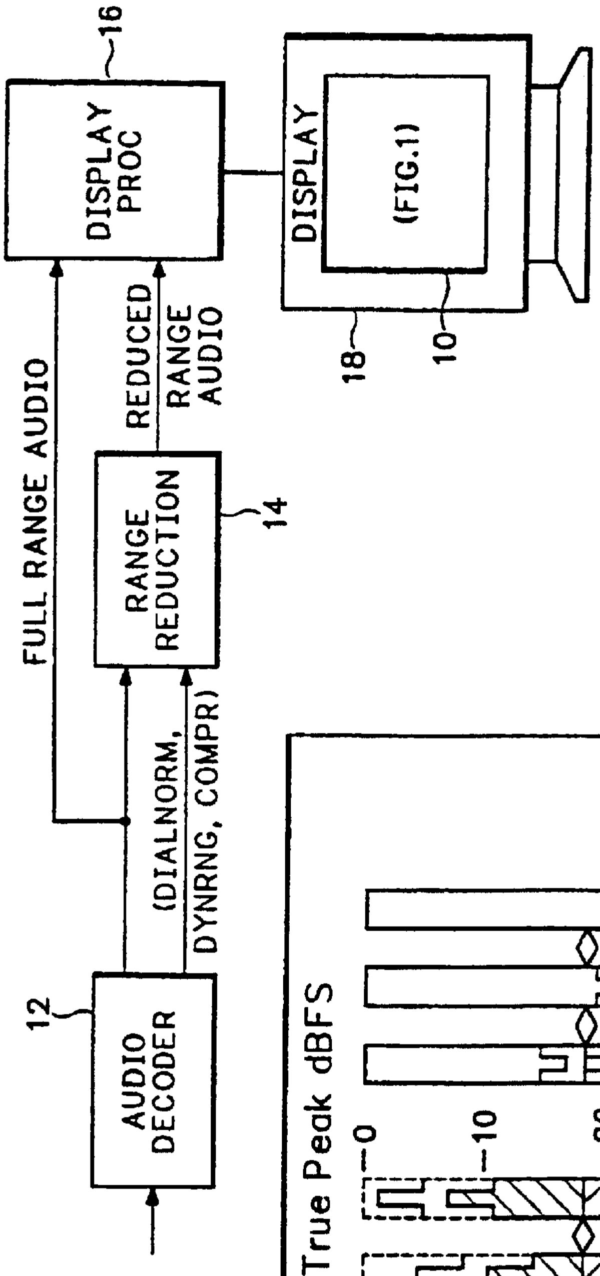
FIG. 2 is a simplified block diagram view of a dual-bar audio level meter for digital audio with dynamic range control according to the present invention.

As shown in FIG. 2 a digital audio signal is input to an audio decoder 12, such as a Dolby AC-3 decoder, and a full range decoded audio signal is output along with the dynamic range control data dialnorm, dynrng, compr. The dynamic range control data and the decoded audio signal are input to a dynamic range reduction processor 14 to provide a reduced range decoded audio signal. The full range and reduced range audio are input to a display processor 16 which produces the outer bars for the reduced range audio signal and the inner bars for the full range audio signal on a suitable display device 18.

Thus the present invention provides a dual-bar audio level monitor for digital audio signals with dynamic range control by decoding the digital audio signals to obtain full range audio signals and dynamic range control parameters, processing the full range audio signals with the dynamic range control parameters to produce reduced range audio signals, and then processing the full range and reduced range audio signals to produce a dual-bar display where the output bars represent the reduced range audio signals and the inner bars represent the full range audio signals.

What is claimed is:

1. A method of displaying simultaneously a full range audio signal and a reduced range audio signal derived from an input digital audio signal with imbedded control parameters, the input digital audio signal having a plurality of channels, comprising the steps of:

decoding the input digital audio signal to extract the full range audio signal and the control parameters;

generating the reduced range audio signal from the full range audio signal using the control parameters; and displaying the reduced and full range audio signals as a bar graph for each channel of the input digital audio signal, each channel having a display with three bars, wherein the three bars are parallel to each other and adjoined thus sandwiching one of the bars between the other two, with the sandwiched bar representing an instantaneous level of one of either a first or a second signal, the first signal being the reduced range audio signal and the second signal being the full range audio signal, and with the other two bars both representing an instantaneous level of one of either the first or the second signal that is not being represented by the sandwiched bar, whereby the sandwiched bar appears to form a single, inner bar and the other two bars appear to form a single, outer bar.

2. The method as recited in claim 1 further comprising the step of displaying a dual peak indicator for the reduced and full range audio signals for each channel.

* * * * *